US012759163B2

(12) United States Patent
Soto Arriaza et al.

(10) Patent No.: US 12,759,163 B2
(45) Date of Patent: Oct. 13, 2026

(54) AUTONOMOUS ROBOTIC SYSTEM FOR COLLECTING PRODUCTS

(71) Applicants: PONTIFICIA UNIVERSIDAD CATOLICA DE CHILE, Santiago (CL); ODDNESS TECHNOLOGIES SPA, Santiago (CL)

(72) Inventors: Álvaro Marcelo Rodrigo Soto Arriaza, Santiago (CL); José Antonio Eyzaguirre Domínguez, Santiago (CL); Juan Pablo De Vicente Jouanne, Santiago (CL); Daniel Alberto Calabi Guzmán, Santiago (CL)

(73) Assignees: PONTIFICIA UNIVERSIDAD CATOLICA DE CHILE, Santiago (CL); ODDNESS TECHNOLOGIES SPA, Santiago (CL)

( * ) Notice: Subject to any disclaimer, the term of this patent is extended or adjusted under 35 U.S.C. 154(b) by 217 days.

(21) Appl. No.: 18/712,890

(22) PCT Filed: Nov. 23, 2021

(86) PCT No.: PCT/CL2021/050113
§ 371 (c)(1),
(2) Date: Jan. 13, 2025

(87) PCT Pub. No.: WO2023/092244
PCT Pub. Date: Jun. 1, 2023

(65) Prior Publication Data

US 2025/0187203 A1 Jun. 12, 2025

(51) Int. Cl.
*B25J 11/00* (2006.01)
*B25J 9/16* (2006.01)

(52) U.S. Cl.
CPC ........... *B25J 11/008* (2013.01); *B25J 9/1661* (2013.01); *B25J 9/1697* (2013.01)

(58) Field of Classification Search
CPC .......... B25J 11/00; B25J 11/008; B25J 15/06; B25J 18/02; B25J 5/02; B25J 9/1661; B25J 9/1697; B65G 1/137; B66F 9/18
USPC .................................................. 700/245–264
See application file for complete search history.

(56) References Cited

U.S. PATENT DOCUMENTS

| | | | | |
|---|---|---|---|---|
| 9,953,287 | B1 * | 4/2018 | Mcdonald, Jr. | G06Q 10/0832 |
| 10,399,778 | B1 * | 9/2019 | Shekhawat | B65G 1/1373 |
| 10,752,442 | B2 * | 8/2020 | Shekhawat | B25J 9/1664 |
| 10,954,067 | B1 * | 3/2021 | Theobald | B25J 19/022 |
| 11,235,930 | B2 * | 2/2022 | Bastian | B25J 15/0616 |
| 11,345,030 | B2 * | 5/2022 | Natarajan | G06N 20/00 |
| 11,697,203 | B2 * | 7/2023 | Jung | G05D 1/0274 700/245 |
| 2005/0131645 | A1 * | 6/2005 | Panopoulos | G05D 1/0282 701/472 |
| 2012/0150342 | A1 * | 6/2012 | Song | B07C 3/02 700/226 |
| 2016/0167228 | A1 * | 6/2016 | Wellman | B25J 9/1602 901/3 |
| 2016/0304281 | A1 * | 10/2016 | Elazary | B65G 1/1373 |
| 2017/0166399 | A1 * | 6/2017 | Stubbs | G06Q 10/087 |
| 2018/0158016 | A1 * | 6/2018 | Pandya | G05B 19/41895 |
| 2019/0105687 | A1 * | 4/2019 | Bombaugh | B07C 3/10 |
| 2020/0030967 | A1 * | 1/2020 | Goodwin, III | B66F 9/063 |
| 2020/0055671 | A1 * | 2/2020 | Toebes | G06Q 10/083 |
| 2020/0242544 | A1 * | 7/2020 | Galluzzo | B25J 9/1692 |
| 2020/0391385 | A1 * | 12/2020 | Oka | B25J 9/1666 |
| 2021/0032031 | A1 * | 2/2021 | Kalouche | B65G 1/0464 |
| 2021/0179356 | A1 * | 6/2021 | Chen | G06T 7/70 |
| 2021/0213616 | A1 * | 7/2021 | Ross | G05D 1/0274 |
| 2021/0323767 | A1 * | 10/2021 | Liu | B66F 9/122 |
| 2022/0164767 | A1 * | 5/2022 | Hiroto | B25J 5/007 |
| 2022/0292543 | A1 * | 9/2022 | Henderson | G06Q 30/0252 |
| 2022/0297958 | A1 * | 9/2022 | Moreno | B25J 13/08 |
| 2022/0315352 | A1 * | 10/2022 | Sun | B65G 47/69 |
| 2022/0334560 | A1 * | 10/2022 | Lovett | B25J 9/1697 |
| 2022/0348409 | A1 * | 11/2022 | Sun | B07C 5/36 |
| 2025/0164996 | A1 * | 5/2025 | Cristache | B60L 53/57 |

OTHER PUBLICATIONS

ISR for International Application PCT/CL2021/050113 mailed Jul. 20, 2022.
Written Opinion for International Application PCT/CL2021/050113 mailed Jul. 20, 2022.

* cited by examiner

*Primary Examiner* — Jonathan L Sample
(74) *Attorney, Agent, or Firm* — LADAS & PARRY LLP

(57) ABSTRACT

The present invention relates to a method of operation and autonomous robotic system for remotely collecting products in stores. The system includes a mobile robot, and navigation, product recognition and multi-objective planning systems. The mobile robot comprises vision sensors to obtain image and distance information, a mobile base, and an actuator or robotic arm arranged on the mobile base and which can perform movements in height, depth and rotation to handle and move products from store shelves to a temporary storage area. Said actuator comprises an end effector with at least two suction cups of different sizes and having rotational and tilting movements about a vertical axis. The product recognition system comprises identification algorithms configured to recognise, based on the vision information, object shapes corresponding to an external shape, and to read logos or texts on the products to identify the products, obtaining location and distance information about the identified products. The main objective of the invention is to provide a mobile robot capable of collecting and handling items or products of different shapes and sizes, without requiring operator intervention or replacement of the tools used.

16 Claims, 13 Drawing Sheets

AUTONOMOUS ROBOTIC SYSTEM FOR COLLECTING PRODUCTS

CROSS REFERENCE TO RELATED APPLICATIONS

This application is an application under 35 U.S.C. 371 of International Application No. PCT/CL2021/050113 filed on 23 Nov. 2021. This application is incorporated herein by reference in their entirety.

The invention relates to an autonomous robotic system for collecting products. Furthermore, the invention relates to an actuator specially designed for the retrieval of products from shelves in a store and to the possibility of using said system remotely through a method of operating an autonomous robotic system for collecting products remotely from a virtual store.

The main objective of the invention is to provide a mobile robot that is capable of autonomously navigating the aisles of a store or real location, with the ability to collect various products from shelves in said store. According to one embodiment, the collection of products is conducted from a selection of products to be collected, which can be issued by a user remotely, wherein said selection of products is executed through a user interface with a virtual graphical representation of the store or real location.

Specifically, the proposed solution solves problems associated with the purchase of products in stores, mainly the coordination and planning of routes, autonomous navigation within a store, recognition of products on shelves and robotic manipulation and collection of products from shelves.

BACKGROUND

Currently, there is a growing interest in adopting technologies associated with the automation and implementation of autonomous robotic systems that assist in different tasks of daily life. Purchasing products in the retail industry is one of the tasks that requires the most time for consumers, both with respect to the transfer to stores and with respect to the purchasing process itself, which means walking through a large number of aisles in the store while products are selected. Therefore, the need arises to facilitate the purchasing process and, if possible, to avoid transfers to stores to execute said purchasing process, a need that is currently addressed by online purchases and home deliveries, mainly. In addition, these types of solutions also solve problems associated with the impossibility of attending a store, either due to time and/or travel restrictions.

The vast majority of existing solutions are designed to navigate spaces specially designed for the movement of robots or machinery, such as warehouses or distribution centers with special guides or structures for the operation of each robot, as well as to recover or collect products with special packaging that facilitates handling. These scenarios and solutions do not consider the difficulties associated with navigating real store spaces, such as direct customer service supermarket stores, nor with handling products arranged in said real stores, an arrangement that not only involves packaging and products of different sizes and shapes, but is constantly evolving with respect to the layout on the shelves and stock of products.

Among the most notable solutions is the one proposed in WO2016014917A1, which describes an autonomous robot that has an articulated arm for collecting products or articles from shelves. Although said solution presents capabilities that would be similar to the invention, indicating that the end effectors can be of different types to collect different products, its main disadvantages are that it has a design that is not optimized for the collection of different types of products from shelves of a real store, in addition to proposing a complex and unscalable robotic configuration. Indeed, in order to expand the versatility of the system proposed in WO2016014917A1, replacement or adaptation operations of end effectors must be carried out depending on the type of product to be collected, making its implementation impossible where the products to be collected have a great variation both in their external configuration (shapes and types of containers) as well as in their properties (weight, volume, center of mass, etc.). Furthermore, in terms of the configuration of the robotic arm used to position the end effector in front of the target product, the system proposed in WO2016014917A1 consists of a robotic arm with at least 5 joints. In the case of collecting products from retail store shelves, this configuration introduces unnecessary complexity that can be resolved by using a simpler configuration specially designed for the scenario described.

Consequently, there is a need for a robotic solution capable of adapting to the environment of a real store, not only in terms of searching and identifying products or items to be collected, but also being able to collect different types of products without the need of operator intervention or replacement of tools that involve system unavailability.

On the other hand, in the retail industry, the current strong trend is the explosive growth of online sales. However, in the food industry, online sales penetration has been more moderate. In this area, the market continues to be largely dominated by the physical megastore format, supermarkets and hypermarkets. The current situation indicates an urgent need to develop technologies that improve the logistical aspects behind the management of purchase orders generated by online sales, for example, reducing the times and/or costs associated with the collection and packaging of products, which allows minimizing the operating cost. Furthermore, it is desirable to have alternatives to improve the online shopping experience, for example, bringing the virtual shopping experience closer to the in-store shopping experience.

Therefore, it is necessary to have an autonomous robotic system that provides a comprehensive solution to the main problems involved in collecting various products in a store, in accordance with what was indicated above, comprising an actuator specially designed to collect products from shelves in stores. Furthermore, it is desirable that said solution can be integrated into a user experience platform associated with virtual shopping, which improves the user experience through an autonomous robotic system operation methodology.

DESCRIPTION OF THE INVENTION

Unlike existing solutions, the proposed solution presents a robotic system specially designed for the collection of items in stores, with the ability to manipulate items or products of different shapes and sizes. In addition, the solution may incorporate a user interface that does not simulate the physical store or generate a 3D virtual reality representation, but instead it generates a virtual representation of the store that resembles the real store, but with a configuration adapted to the needs or preferences of each user, specially designed to facilitate its use on portable devices. In this sense, the proposed interface does not require virtual reality equipment, but it is designed so that the user can execute it directly on the screen of their portable device. For example, the virtual representation may include only one infinite hallway, which can be traversed sequentially or by jumping to different sections based on the selection of specific categories or products.

As has been highlighted, in order to collect products in the store, the solution incorporates one or more autonomous mobile robots, each one equipped with a mechanism specially designed to pick and collect the products from the shelf while it moves autonomously through the store. Specifically, given a selection or list of products and a map of the store with the planimetry (layout) of the shelves, the proposed solution incorporates a planning system that calculates an optimal route for the robot to collect all the required products efficiently.

In addition, the solution includes a visual recognition system to identify real products directly on the store shelves without the need for special codes that facilitate the identification of each product, as well as components specially designed to collect and transport products from shelves in a store, such as a supermarket or a product collection warehouse.

For that purpose, the invention relates to an autonomous robotic system for collecting products in a real store, which comprises:

- at least one real store comprising shelves with real products;
- at least one mobile robot which is formed by a body comprising:
  - at least one processing unit;
  - at least one communications unit;
  - at least one vision sensor assembly configured to obtain image information and distance information, called vision information;
  - a mobile base comprising at least one drive unit configured to drive and direct the mobile robot;
  - at least one actuator arranged on the mobile base configured to manipulate and move real products from the shelves of the real store; and
  - at least one temporary storage region arranged on the movable base configured to receive real products from the at least one actuator;
- a navigation system in communication with the at least one drive unit, through the at least one communications unit and the at least one processing unit, wherein the navigation system accesses planimetry information of the real store;
- a product recognition system in communication with the at least one vision sensor assembly, through the at least one communications unit and the at least one processing unit, wherein the product recognition system accesses the vision information; and
- a multi-objective planning system in communication with the navigation system;
- a computer system in communication with the multi-objective planning system and the product recognition system; and
- at least one user device in communication with the computer system.

Furthermore, the system of the invention may comprise a computer system in communication with the multi-objective planning system and with the product recognition system and at least one user device in communication with the computer system. The computer system which may be integrated into the mobile robot, and which may comprise the user device, one or more servers on the network and/or cloud computing, may be configured to process a graphical representation of the real store called virtual store. The virtual store may comprise shelves with a graphic representation of real products, called virtual products. The virtual products can be arranged on the shelves of the virtual store in a way similar to the real one which can be recreated based on the user's preferences.

The at least one user device which may correspond to a portable device, such as a Smartphone, may be configured to display the virtual store to a user through a user interface, for example, through an application installed on the user device or by accessing a web page. Said user interface may be configured to receive at least one selection of virtual products from the user, for example, by generating a basket of products or purchase order, and to communicate said at least one selection of virtual products to the computer system. According to one alternative, the computer system receives a selection of products that corresponds to one or a combination of a real-time selection of products, by a user or a predetermined selection of products, not necessarily from a virtual store source.

The computer system may be configured to receive the at least one selection of virtual products and to communicate it to the multi-objective planning system and the product recognition system which, regardless of the above, may be integrated into each mobile robot or in communication with the same from a central control unit. Based on the planimetry information of the real store or store layout which includes not only the distribution of aisles in the store, but also the location of the products, the multi-objective planning system is configured to calculate one or more routes optimal for the collection of real products that match the products to be collected, either according to a predetermined purchase order or through at least one selection of virtual products. Said one or more optimal routes are communicated to the navigation system.

The navigation system which may be integrated into each mobile robot or in communication with the same from a central control unit, is configured to receive said one or more optimal routes and to drive the at least one drive unit of at least one mobile robot to travel the real store following at least one received optimal route. Furthermore, the navigation system may be in communication with the vision sensor assembly using the same to receive image and distance information (vision information) useful for the navigation of the robot. Alternatively, the navigation system may be in communication with a navigation sensor assembly arranged on the mobile robot and similar to the vision sensor assembly, but specially designed to capture navigation information for the robot navigation. Such navigation information may be of the same type as vision information, that is, image and distance information.

The product recognition system comprises identification algorithms configured to identify each real product on the shelves of the real store. The at least one vision sensor assembly in communication with said product recognition system is arranged to obtain vision information of the real store shelves, said vision information may comprise information about the planogram of at least one section of the store, including location information of the products in the planogram, for example, through Cartesian X and Y axes and distance information between the products and the mobile robot, for example, through distance information from a suitable sensor. The identification algorithms are configured to recognize shapes of objects corresponding to an exterior shape of the real products in said vision information, and to read logos or texts of the real products in said vision information particularly in the image information identifying the real products and obtaining location and distance information of the identified real products.

When a mobile robot, traveling through the real store, following at least one of the optimal routes identifies a real product that matches one of the products of the selection of products to be collected, for example, with one of the virtual products of the at least one selection of virtual products received, the product recognition system is configured to drive the at least one drive unit of the at least one mobile robot to position itself in the vicinity of the shelf where said matching real product is located and to drive the at least one actuator of the at least one mobile robot based on the location and distance information of the matching real product, to collect the matching real product from the shelf and place it in the at least one temporary storage region. Once the matching real product is located in the temporary storage region, the mobile robot may continue with the at least one optimal route to collect the next product or to end said route.

In this context, the method of operation of the autonomous robotic system defined above for collecting products remotely from a virtual store, includes the stages of:

a) to show, by means of the at least one user device, a virtual store to a user through a user interface, wherein said virtual store is a graphic representation of the real store and comprises shelves with a graphic representation of the real products, called virtual products;

b) to receive, through said user interface, at least one selection of virtual products by the user, communicating said at least one selection of virtual products to the computer system, wherein the computer system communicates said at least one selection of virtual products to the multi-objective planning and product recognition system;

c) to calculate, through the multi-objective planning system and based on the planimetry information of the real store, one or more optimal routes for the collection of real products matching the at least one selection of virtual products communicating said one or more optimal routes to the navigation system;

d) to actuate, through the navigation system the at least one drive unit of at least one mobile robot to travel the real store following at least one received optimal route;

e) to identify, by means of the recognition system that comprising identification algorithms, real products that match the virtual products of the at least one selection of the virtual products received, comprising:

e.1) to obtain, by means of the at least one vision sensor assembly, vision information of the of the real store shelves.

e.2) to recognize objects shapes corresponding to an exterior shape based on the visual appearance of real products in said vision information, and e.3) to read logos or texts of the real products in said vision information identifying the matching real products and obtaining location and distance information of the identified matching real products;

f) to collect the identified matching real products, wherein the product recognition system drives the at least one drive unit of the at least one mobile robot to position itself in the vicinity of the shelf where an identified matching real product is located and drives the at least one actuator of the at least one mobile robot based on location and distance information of the identified matching real product, in order to collect it from the shelf of the real store;

g) to place the collected real products in the at least one temporary storage region located in the body of the at least one mobile robot; and h) to continue with at least one optimal route.

According to one embodiment of the invention, before showing the virtual store and the virtual products, the solution comprises generating by means of the computer system, the virtual store with the virtual products based on a set of virtual stores and/or predetermined virtual products. Furthermore, according to an alternative, the solution comprises determining a layout of the virtual store and the virtual products in the user interface according to the previously communicated user preferences, inferred according to their historical purchasing patterns or entered into the computer system from the at least one user device or by some other means.

According to one embodiment of the invention, the solution comprises traveling, by the user and through the user interface, at least one virtual aisle of the virtual store through which the user can travel through the virtual store at the same time as viewing the virtual products arranged on the shelves of the virtual store. As an example, the virtual store may be a two-dimensional representation of the real store formed by a single aisle with shelves of virtual products on one or both sides, wherein the user interface comprises at least two visualizations of the virtual store, one where part of the aisle and the virtual products arranged on the shelves are visualized and another where the environment of a subset of virtual products is visualized in greater detail. Each user may select these options or other user interface display alternatives according to their preferences. In this context, according to a special alternative for low-performance user equipment, the user's travel in the virtual store may comprise showing pre-generated navigation sequences that closely reflect the user's travel in the virtual store, wherein said sequences may correspond to a set of navigation images sent by the computer system to the user device through distribution networks. The user's navigation or travel in the virtual store may be controlled using input elements of the user device, such as keyboard and/or mouse, by gestures on a touch screen or by voice instructions.

According to one embodiment of the invention, the real store planimetry information comprises the location of each real product in the real store. In this embodiment, the step of calculating the one or more optimal routes is executed based on the location of the matching real products according to said planimetry information, so that at least one mobile robot goes directly towards said location of the real products according to the one or more optimal routes. Alternatively, the solution comprises generating and/or updating the planimetry information of the real store based on the vision information obtained by at least one mobile robot that travels through the virtual store, both in an initial stage and during any product collection process. As an example, real store planimetry information may be updated in real time with product location and stock information, either through vision information captured by a mobile robot during its product collection operation or through mobile robots specially designed for these purposes, capturing information associated with traveling through the real store.

According to one embodiment of the invention, the step of calculating the one or more optimal routes for at least one mobile robot is executed based on one or more of:

number of virtual product selections communicated to the computer system;

type of matching real products; and location of matching real products.

Alternatively, the proposed solution comprises coordinating, through the multi-objective planning system, two or more mobile robots for the collection of matching real products associated with one or more selections of virtual products. In this case, the multi-objective planning system assigns each matching real product to one of the mobile robots, for example, based on its location in the store or type of real products to be collected, and the multi-objective planning system adapts the route of each mobile robot and the collection order of the matching real products calculating at least one optimal route for each mobile robot. Furthermore, the multi-objective planning system is capable of generating optimal routes for one or more robots serving one or more purchase orders, where the optimal route calculation may be configured according to multiple operating objectives, such as minimum use of robots, minimum distance traveled or less delay time, for example.

According to one embodiment of the invention, the step of collecting the identified matching real products by actuating the at least one actuator to collect a matching real product based on the location and distance information of said matching real product, comprises executing a set of movements of the at least one actuator according to a position of the matching real product and a distance between the at least one actuator and the matching real product.

In this context, the at least one actuator proposed by the invention comprises degrees of freedom specially adapted to collect real products from shelves and move them towards the at least one temporary storage region. In this sense, the actuator has at least two degrees of freedom, comprising the following movements:

- in height, along a first vertical axis covering a height of the shelves in the real store; and
- in depth, along a first horizontal axis covering the distance between the mobile robot and the products to be collected.

Furthermore, the at least one actuator of the mobile robot comprises a third degree of freedom, comprising rotational movement around a second vertical axis which may match the first vertical axis, covering at least two positions, one products collection position from real store shelves and one temporary product storage position in the at least one temporary storage region.

On the other hand, the at least one actuator comprises an end effector comprising at least two suction cups, wherein one suction cup is smaller than the other. Preferably, the end effector comprises two suction cups of equal size and a third suction cup of smaller size. Said end effector, in turn, has at least two degrees of freedom, comprising the following movements:

- rotation about a second horizontal axis which may match the first horizontal axis, rotating the end effector to position it correctly in relation to the matching item or product to be collected; and
- tilting, by tilting the end effector once the matching product has been collected compensating for the strength to weight ratio of said product.

The movements of the at least one actuator and its end effector are driven by at least one drive unit. Preferably, each movement comprises its own drive unit which may be made up of two or more drive subunits, providing:

- a first drive unit for moving the actuator in height along the vertical axis, wherein the actuator is configured by a main body that extends vertically, a secondary body slidably attached to the main body and a movement mechanism as a chain or belt configured to vertically move said horizontal support sliding it up and down with respect to the main body spanning the height of the shelves in the real store;
- a second drive unit for moving the actuator in depth along the first horizontal axis, wherein the secondary body is extendable in a horizontal direction comprising a first section that slides horizontally with respect to a second section on the first horizontal axis, and wherein said extension in a horizontal direction is activated by a movement mechanism, such as a chain or belt configured to move the first section horizontally with respect to the second section;
- a third drive unit for moving the actuator in rotation around the second vertical axis, wherein the main body of the actuator is articulated to rotate between at least two positions, one position of collecting products from shelves of the real store and a temporary products storage position in the at least one temporary storage region, and wherein said joint is activated by a movement mechanism such as a chain or belt or gear configured to rotate the main body around the second vertical axis;
- a fourth drive unit for rotating the end effector around the second horizontal axis, wherein said end effector or handling unit which is arranged at one end of the first section of the secondary body of the actuator, is articulated to rotate about the second horizontal axis; and wherein said joint is activated by a movement mechanism, such as a belt, chain or gear configured to rotate the end effector about the second horizontal axis; and
- a fifth drive unit for tilting the end effector upwards compensating for the strength to weight ratio of the collected product, wherein the end effector or handling unit is articulated to tilt, introducing an angle of inclination between a drive axis of the effector and a plane horizontal, and wherein said joint is activated by a movement mechanism, such as a chain, belt or gear configured to tilt the end effector. The tilting motion of the end effector is not only used to compensate for the strength to weight ratio of the collected product by tilting upwards, but it may also be used to tilt the end effector downwards, for example, when the collected product is deposited in at least one temporary storage region of the mobile robot.

Finally, the end effector or handling unit formed by at least two different suction cups, one of smaller size than the other or, preferably, by two suction cups of equal size and a third suction cup of smaller size, is powered by generating vacuum using a vacuum pump. Said vacuum pump together with its operating components such as ducts and valves, is preferably mounted integrally to the secondary body of the actuator, mainly to its second section.

BRIEF DESCRIPTION OF THE FIGURES

As part of the present invention, the following representative Figures are exhibited which show preferred embodiments of the invention and, therefore, should not be considered as limitations to the definition of the claimed subject matter.

FIG. 4*a* shows a second example of the vision information captured by the vision sensor assembly once processed by the identification algorithms.

DETAILED DESCRIPTION OF EMBODIMENTS OF THE INVENTION

In relation to what was previously described in the DESCRIPTION OF THE INVENTION section, this section describes more specific aspects of some embodiments of the invention. For that purpose, reference is made to the main aspects of the proposed solution.

Mobile Robot

The present invention comprises mobile robots specially designed to collect or retrieve products from shelves in stores, for example, in supermarkets. Since the products in said stores have different shapes and sizes, one embodiment of the invention comprises a set of mobile robots with specific designs to retrieve several types of products. For example, a first mobile robot to recover products of smaller size and weight up to 3 kg, a second mobile robot to recover products of medium size and greater weight. And a third mobile robot to retrieve large products. Similarly, there may be mobile robots specially designed to retrieve products with special geometries, such as sheets or sleeping bags, which usually come without packaging, as well as mobile robots designed for a wide range of products with two or more suction cups of different capacities as part of an end effector.

Figure 1A:
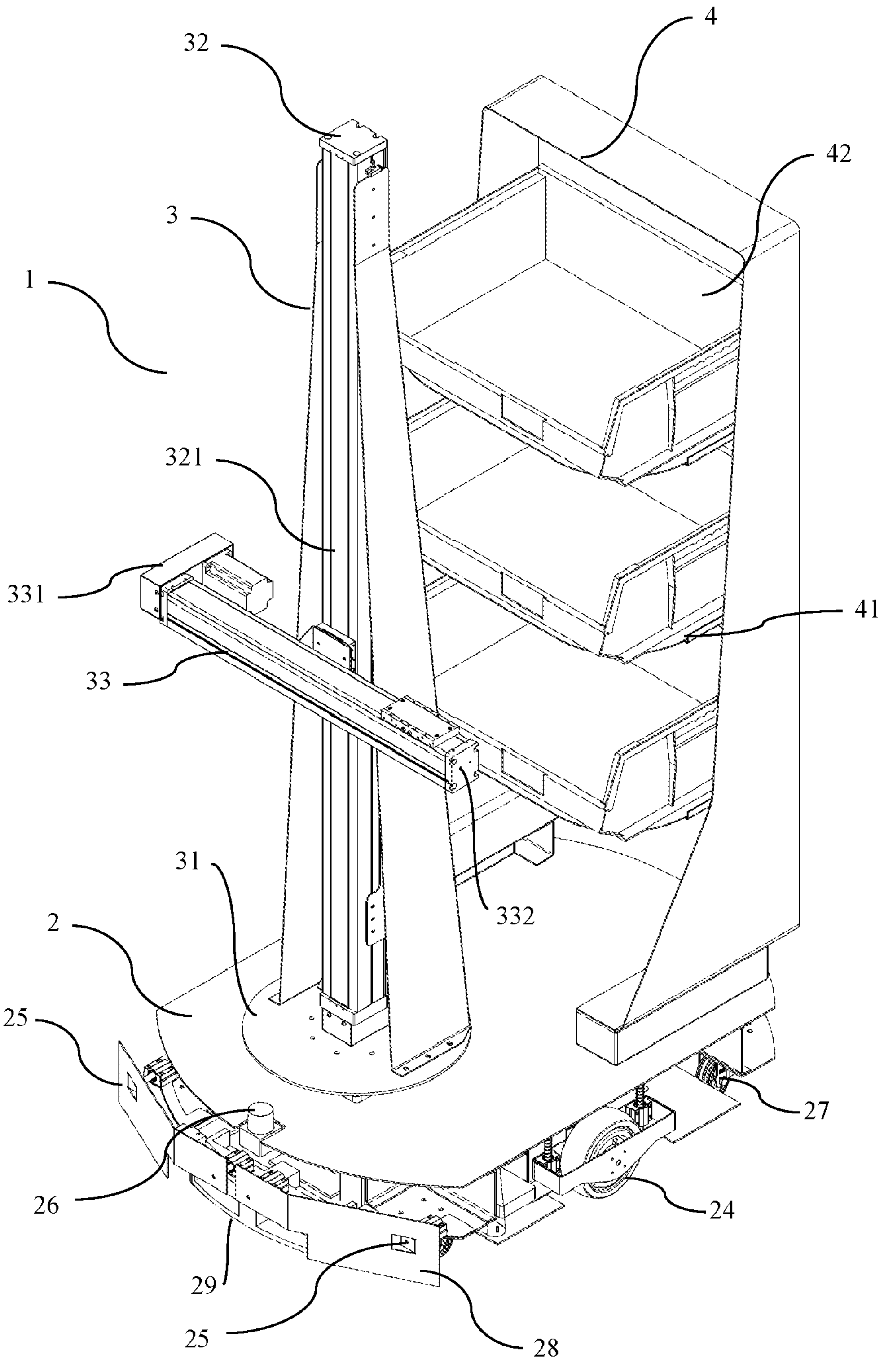
FIG. 1*a* shows a perspective view of a mobile robot according to a first embodiment of the invention.
Figure 1B:
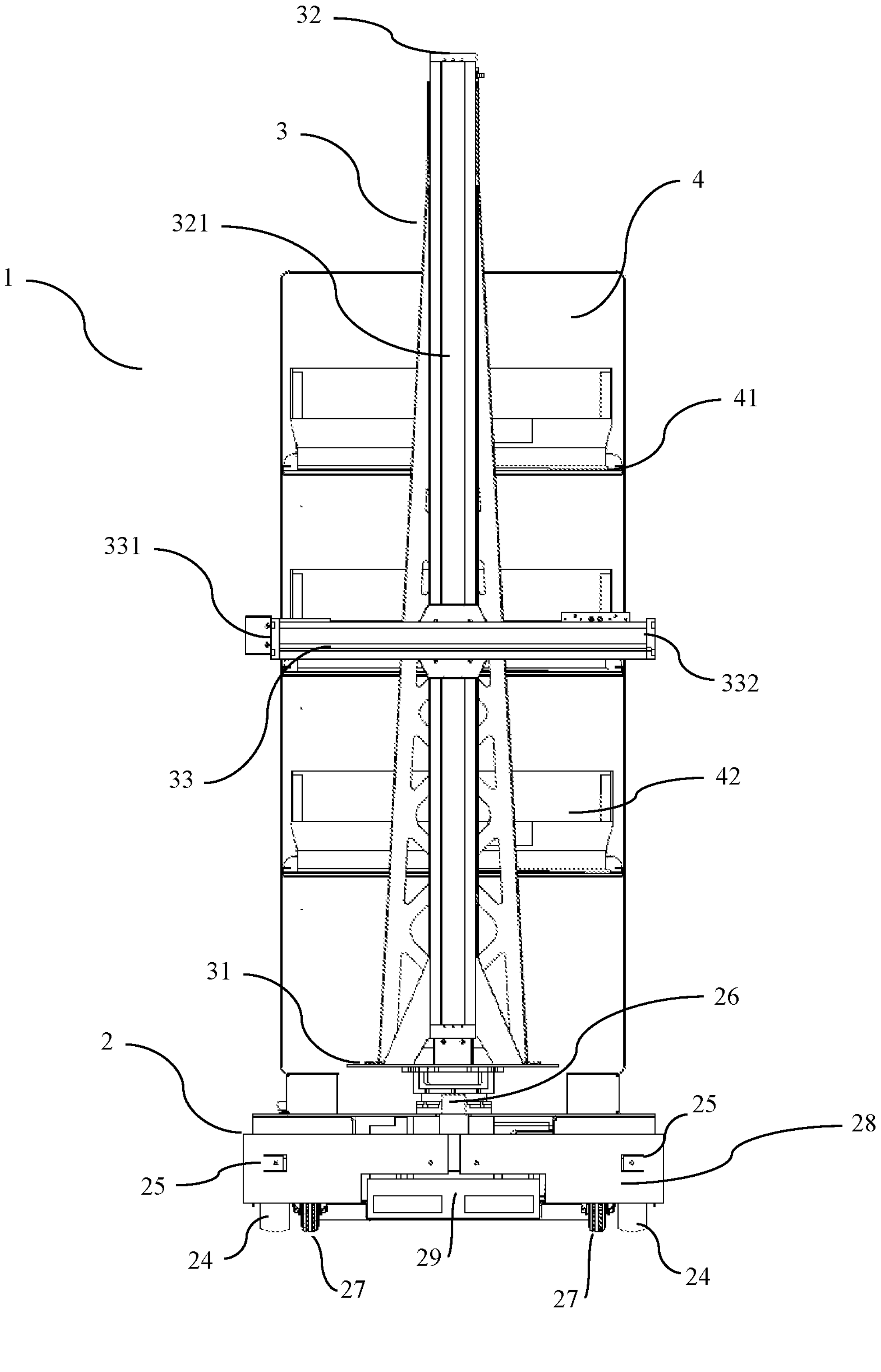
FIG. 1*b* shows a front view of the mobile robot according to FIG. 1*a*.
Figure 1C:
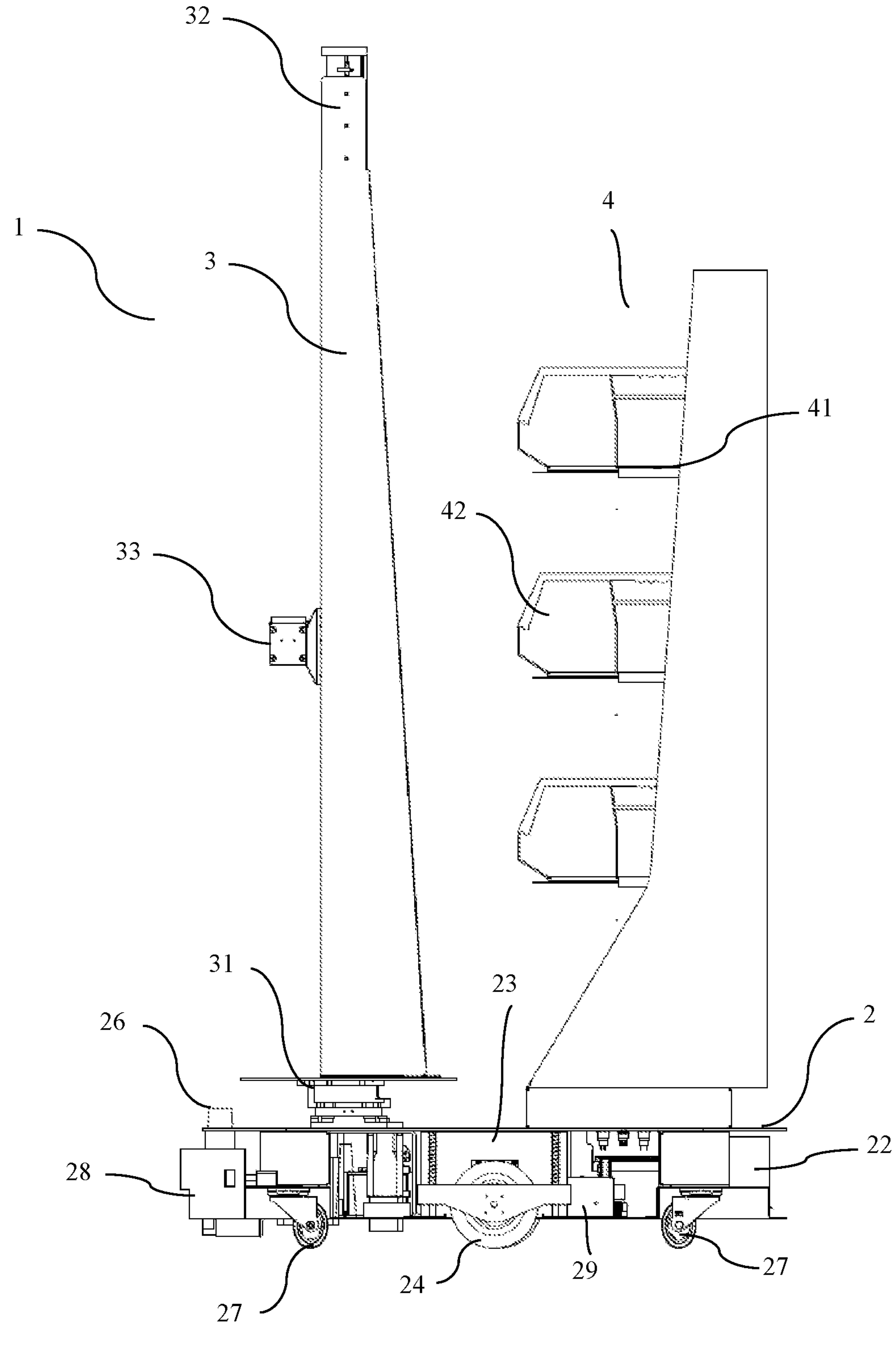
FIG. 1*c* shows a side view of the mobile robot according to FIG. 1*a*.
Figure 1D:
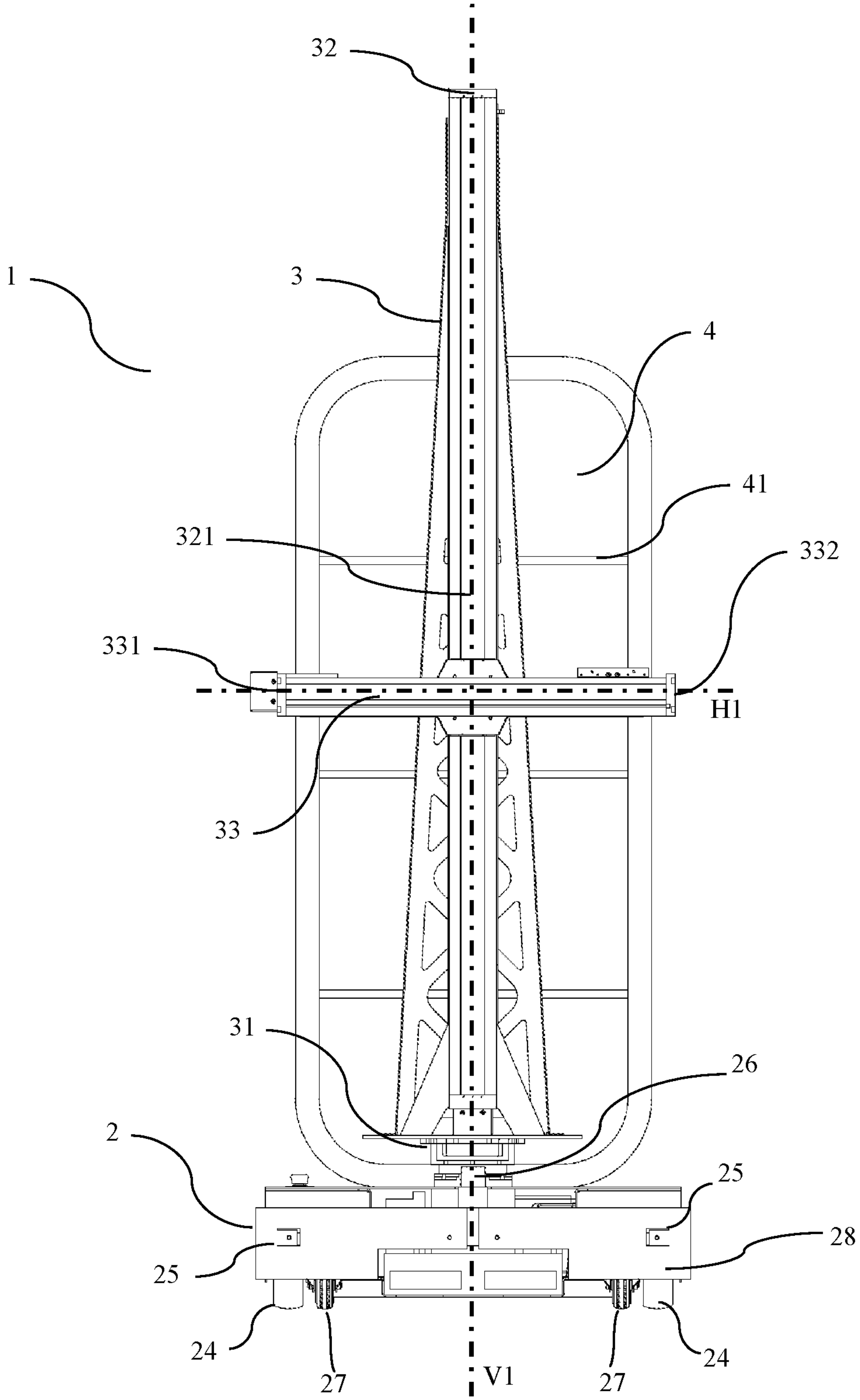
FIG. 1*d* shows a front view of a mobile robot according to a second embodiment of the invention.
Figure 1E:
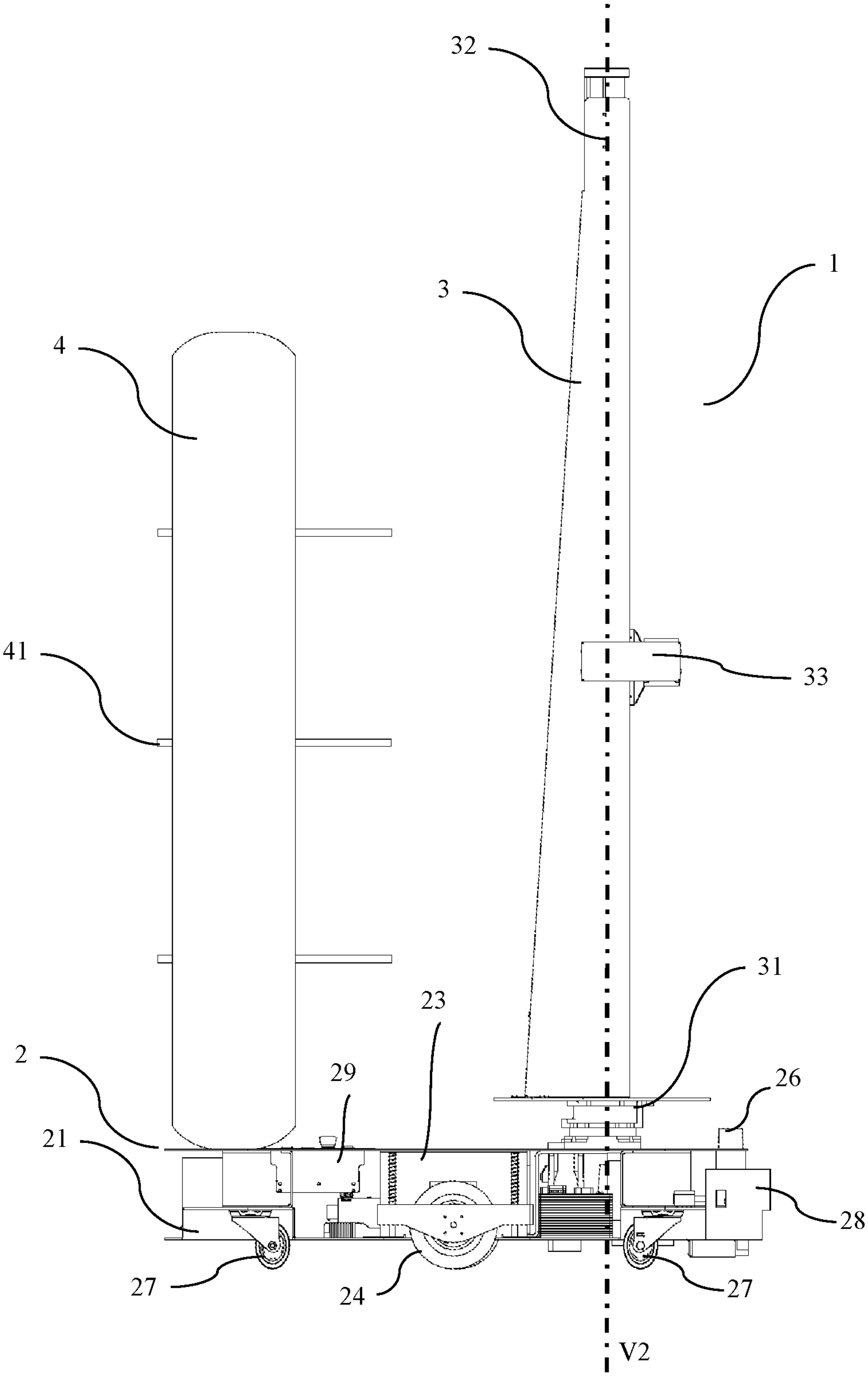
FIG. 1*e* shows a side view of the mobile robot according to FIG. 1*d*.
Figure 1F:
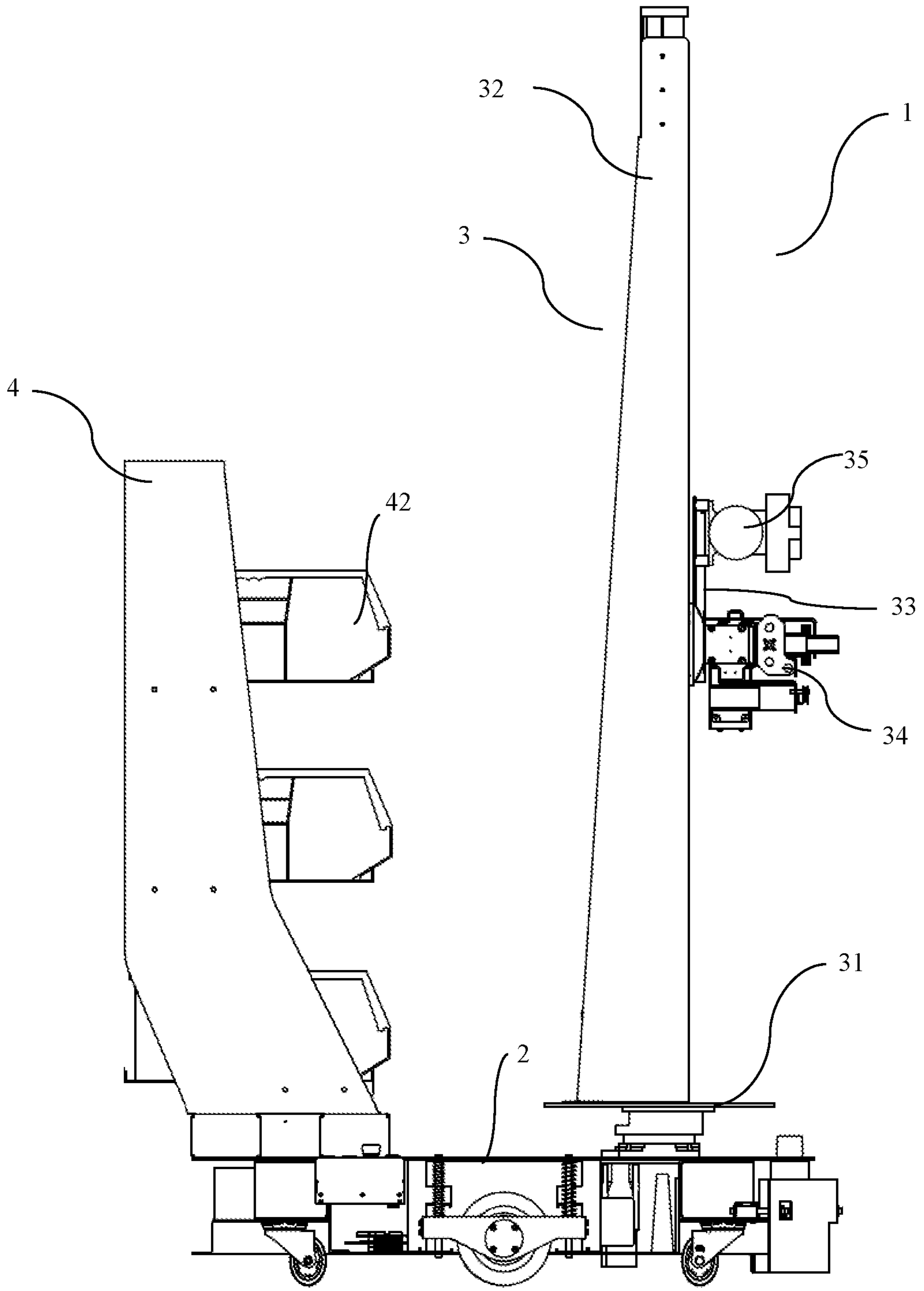
FIG. 1*f* shows a side view of a mobile robot according to a third embodiment of the invention.

The mobile robot (1), according to the embodiments represented in FIGS. 1*a*, 1*d* and 1*f*, is formed by a body that includes three main components:

- a mobile base (2) comprising at least one drive unit configured to drive and direct the mobile robot;
- at least one actuator (3) or robotic arm arranged on the mobile base (2) configured to manipulate and move real products from the shelves of the real store; and
- at least one temporary storage region (4) arranged on the mobile base (2) configured to receive real products from the at least one actuator (3).

Finally, according to an alternative embodiment of the invention, the mobile robot of the invention is capable of operating by receiving and processing purchase orders or product selections received by any other means, that is, not necessarily from a virtual products selection from a virtual store by a user. As an example, the selection of virtual products received by the computer system can be replaced by a list of products received through a telephone call or predetermined in a user account.

Mobile Base

The mobile base (2) according to the embodiment of FIG. 1*a*, is formed by a low-height structure which houses the drive unit of the mobile robot inside. The height of the mobile base (2) is low so as to allow the at least one actuator (3) on said mobile base (2) to cover practically the entire height of the shelves in stores which are usually deployed close to ground level.

As can be seen in FIGS. 1*a*-*e*, the drive unit comprises all the components required to drive the mobile robot (1), that is, at least one power and charging unit (21) connected to at least one battery (22), one or more motors (23), preferably one for each drive element or wheel (24), control and processing units associated with the drive of the robot (not shown).

Additionally, housed inside it, the mobile base (2) may also comprise one or more processing and communications units, as well as sensors associated with the navigation system of the mobile robot, for example, infrared type sensors (25) and/or LIDAR (Laser Light Detection and Ranging) type (26), to detect obstacles. More details of the mobile base (2) can be seen in FIG. 1*b* and FIG. 1*e* which is shown without side covers to visualize its interior, for example, free wheels (27) arranged towards each corner of the mobile base, to facilitate the stability of the mobile robot, a front cover (28) with contact sensors, charging port (29) and other representations through boxes that represent some of the robot units.

Finally, the mobile base (2) is connected to a support (31) that supports at least one actuator (3) arranged on said mobile base (2), where said support (31) may comprise a rotation axis for rotation of the actuator (3) around a second vertical axis (V2), as shown in FIG. 1*e*.

Actuator or Robotic Arm

The actuator (3) or robotic arm according to the embodiment of FIGS. 1*a*, 1*d* and 1*f*, is formed by a base or support (31), a main body (32) that extends vertically comprising a guide component (321) presented in the form of a rail, along which a secondary body slides vertically (33) slidably attached to the main body (32) along a first vertical axis (V1), as shown in FIG. 1*d*. Said secondary body (33) which extends horizontally, is extensible in a horizontal direction comprising a first section (331) that slides horizontally with respect to a second section (332) along a first horizontal axis (H1), as shown in FIG. 1*d*. At one end of said first section (331) an end effector is provided (34) or article or product handling unit, for example, formed by an effector mechanism in the form of suction cups which apply suction to recover the articles. from shelves and position them in the temporary storage region (4).

In this context, the actuator (3) is capable of executing a set of movements to collect products from shelves and position them in the temporary storage region (4), said movements controlled by the recognition system that the robotic system of the invention has. As an example, after identifying the product to be removed and obtaining its location and distance information, the product recognition system activates the actuator (3) moving the secondary body (33) about the first vertical axis (V1), positioning said secondary body (33) at a suitable height according to the location information of the product on the shelf. Then, the recognition system activates the actuator (3) moving the secondary body (33) extending its first section (331) towards the product to be recovered along the first horizontal axis (H1) according to the distance information. Then, the recognition system activates the actuator (3) activating the effector to retrieve the product from the shelf. And finally, the recognition system initiates a set of movements intended to place said recovered product in the temporary storage region (4) of the robot (1).

According to one embodiment, the product recognition system comprises routines for retrieving or collecting products from shelves located in the vicinity of a mobile robot. These routines operate based on the vision information captured by the vision sensor assembly of the mobile robot using an image sensor, such as an RGB-D (Red Green Blue-Depth) type sensor and identifying which product is in front of the robot. With this, the routines include positioning the end effector of the actuator, so that it is in contact with the product then executing different actions depending on which object was identified. In particular, once the searched product has been identified and its position detected based on information from the vision sensor assembly located in the effector, which acquires image and distance information called vision information, the curvature and center of the visible surface of the required product is calculated. With this information, the point of application of the suction is determined, in order to locate the effector in a stable point that maximizes the normal to the suction point and thus the adherence of the product to the effector. In the embodiment of the invention with multiple suction cups, the system determines the positioning of the end effector and suction cups also selecting which cups to activate in order to optimize the adhesion of the product to the effector. Additionally, the image sensor which may be formed by a first camera intended to provide distance information (Depth) and a second camera intended to provide shape information (RGB), is arranged in the end effector, allowing the collection of products is automatic without human supervision. This configuration of image sensor and end effector allows the product detection, recognition, detection of its surface and detection of suitable points to locate the suction cups when taking the product, among others.

Specifically, the routines comprise different sets of movements and performances of the effector, for example, suction pressure level depending on the type of product to be recovered. In this context, to collect products from shelves, a control system for an actuator or robotic arm is implemented. Said control system is configured to control and track points in space according to the position from which a product is recovered and according to the position where each product taken by the robot is to be left. Thus, the robotic arm or actuator is capable of moving autonomously in such a way that its end effector accesses the desired positions.

Figure 1G:
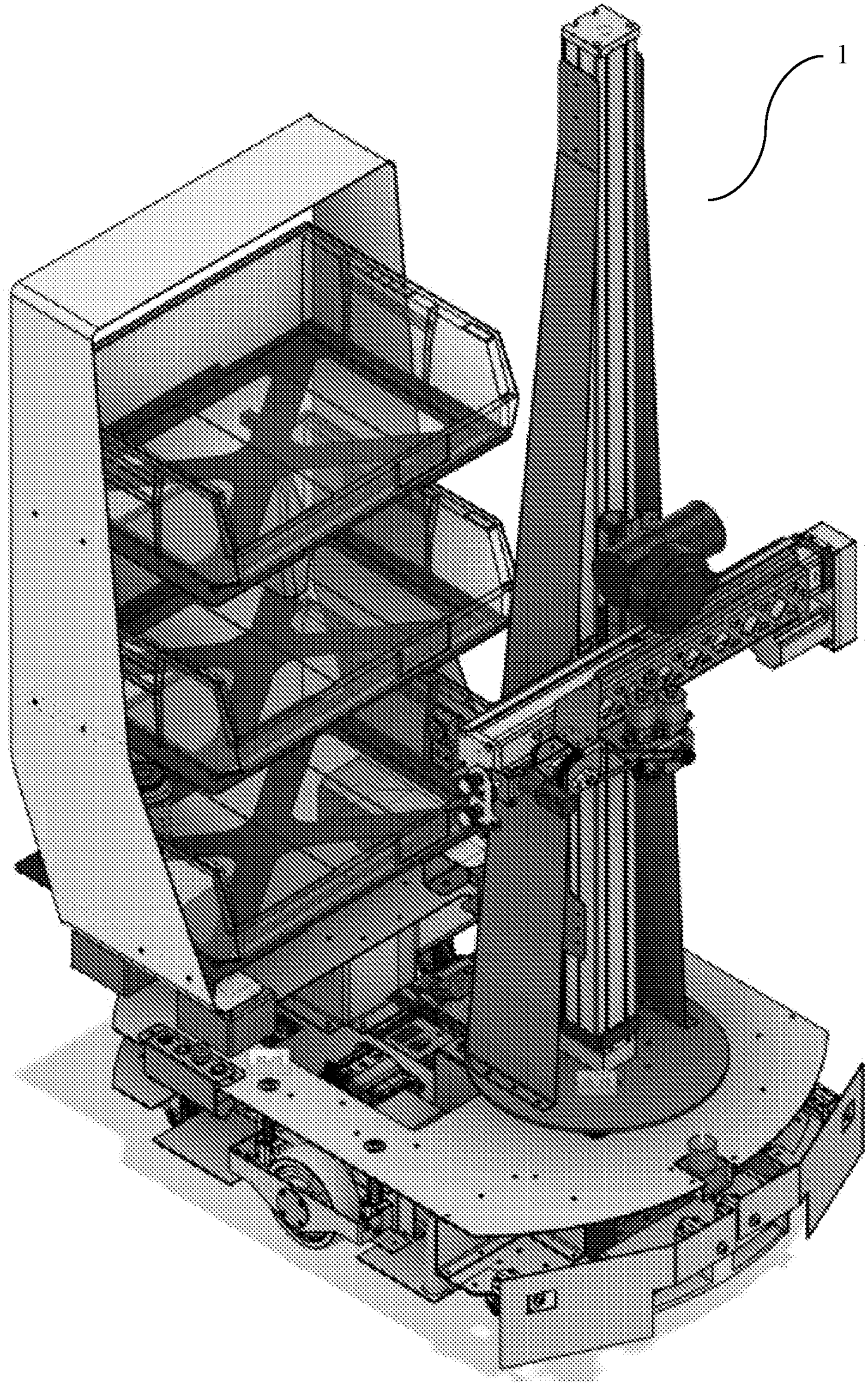
FIG. 1*g* shows a perspective view of the mobile robot according to FIG. 1*f*.
Figure 1H:
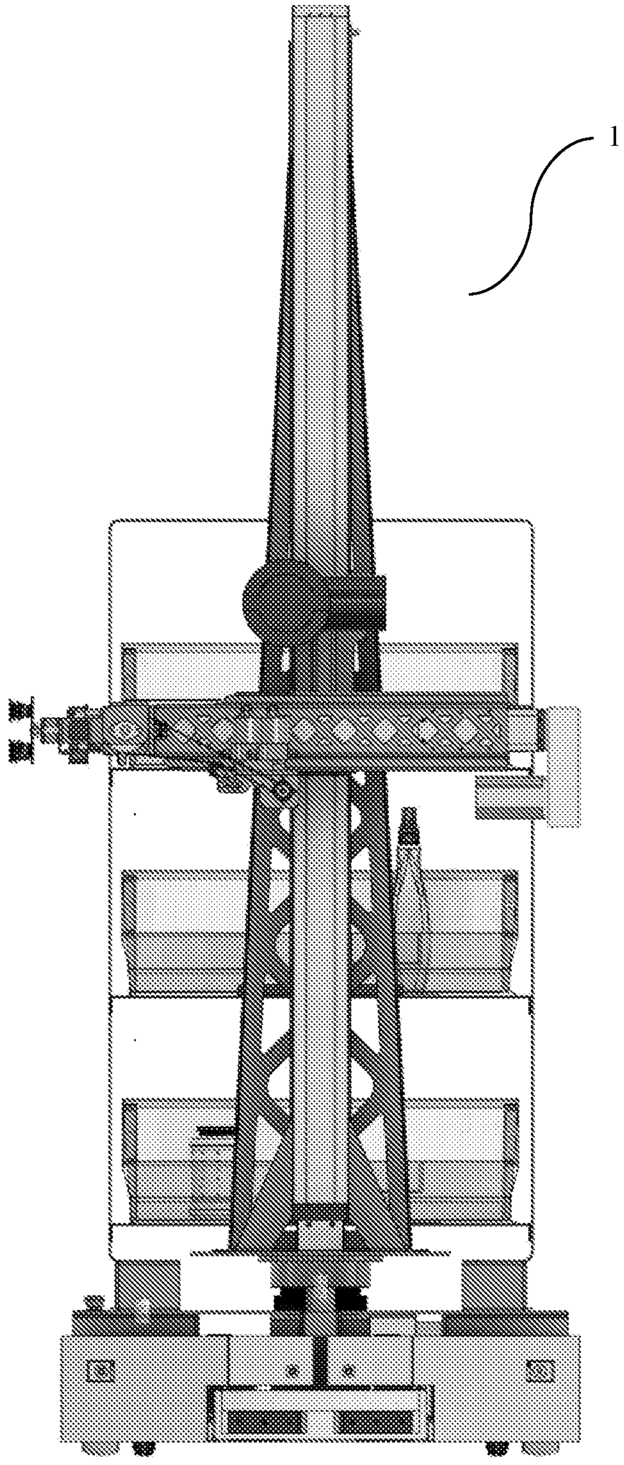
FIG. 1*h* shows a front view of the mobile robot according to FIG. 1*f*.
Figure 1I:
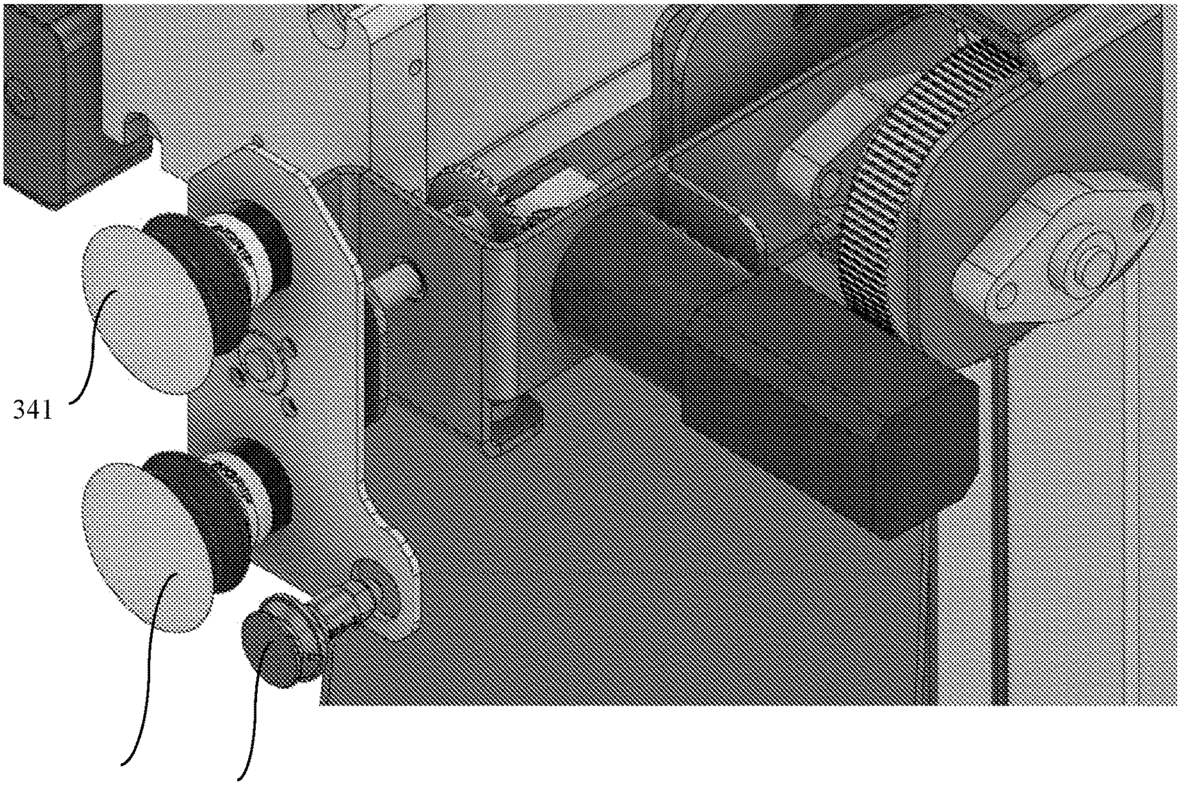
FIG. 1*i* shows a perspective view of part of the end effector of the mobile robot according to FIG. 1*f*.

Furthermore, according to the preferred embodiment, the integration of suction cups is carried out in the end effector (34) of the robotic arm, as shown in greater detail in FIG. 1*i*. For this purpose, a vacuum pump (35) with suction cups is integrated into the end effector (34) of the actuator (3), as shown in FIG. 1*f*, comprising suction and blowing instructions from a controller. This way you can send a suction instruction when you want to pick up an object and then a blow instruction when you want to release the object. It is also worth mentioning that the use of suction cups instead of a gripper allows products with a wide variety of shapes to be taken, since the shape of the suction cups adapts to the surface of the object in question. According to one embodiment, the vacuum pump (35) is mounted in the secondary body (33) of the actuator (3) either in the first section (331) of said secondary body (33), integral with said first section (331) or in the second section (332). In addition, said vacuum pump (35) is capable of taking objects weighing up to 3 kg but depending on the type of products to be recovered, it is possible to manage the operation of mobile robots specially designed for heavier products, integrating suction pumps of greater power or other types of actuators specially designed for this purpose.

Figure 1J:
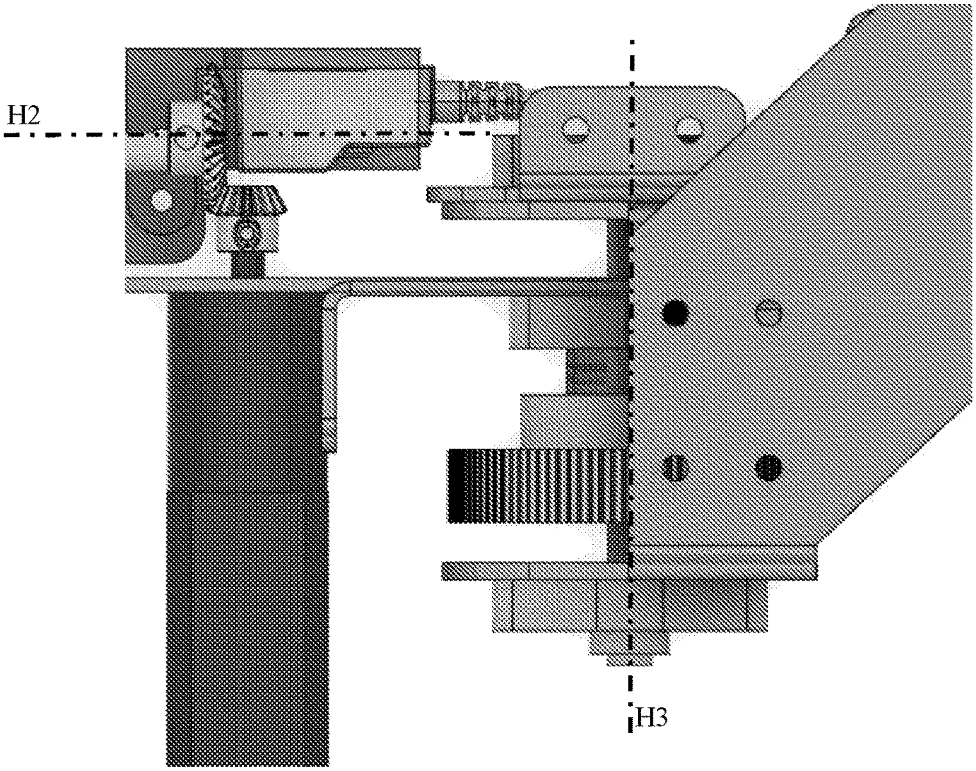
FIG. 1*j* shows a top view of part of the end effector of the mobile robot according to FIG. 1*f*.

FIG. 1*i* shows a detailed scheme of the end effector according to the preferred embodiment of the invention comprising first and second suction cups (341, 342) of equivalent size and capacity and a third suction cup (343) of smaller size and capacity. Through this configuration of at least two suction cups of varied sizes and capacities, the mobile robot has the ability to collect several types of products providing greater versatility to its operation. Furthermore, in FIG. 1*i* it can be seen part of the movement mechanisms of the end effector with respect to rotation about the second horizontal axis and tilt movement. These mechanisms are shown in greater detail in FIG. 1*j*, where the second horizontal axis (H2) and the axis around which the tilt movement is executed (H3) are represented.

In this context, it is important to highlight that the arrangement of the image sensor in relation to the end effect with suction cups of varied sizes allows various products to be taken through automatic evaluation and reconfiguration of the cups used. This reconfiguration has 2 sources, i) to select only some of the cups located on the effector, ii) to rotate the cups about their vertical axis in order to take the object horizontally, vertically or in some other intermediate direction. This will depend on the orientation of the product, as well as its best points for collection, according to its curvature. The latter is relevant since the system integrates the evaluation of the grip points with the decision of how to locate the cups and the decision of which of these cups should be used for collection.

Temporary Storage Region

The temporary storage region (4) is a portion of the mobile robot specially intended for the temporary collection and transportation of products collected from shelves while the mobile robot (1) completes a product collection route. According to one embodiment, it corresponds to a shelf structure (41) mounted on the base (2) of the mobile robot. This product storage structure is specially designed so that the robotic arm or actuator (3) can rotate about its second vertical axis (V2) and then deposit the products on shelves (41) located at different heights in the body of the robot (1). These shelves (41), according to one embodiment, contain independent baskets (42) that allow the robot to collect products of several types or to separately collect products corresponding to different purchase orders.

According to the embodiment shown in FIG. 1*a*, said temporary storage region (4) is configured by a set of basket-type shelves (42), integrated into the body of the mobile robot arranged in the vicinity of the actuator (3) to receive the recovered products and transport them during the robot's travel (1). In this context, the multi-objective planning system includes information on the type of temporary storage region (4) and its capacity, to appropriately assign the product recovery route based on the transportation capacity of each mobile robot.

Alternatively, depending on the type of mobile robot, other configurations of temporary storage region (4) are possible, for example, simple shelves (41) as shown in FIG. 1*d* and in FIG. 1*e*, basket-type shelves (42) as in FIG. 1*a-c* and in FIG. 1*f-h* or spaces specially designed to retain products of different types during the movement of the mobile robot.

User Interface

According to the invention, the user interface comprises a virtual graphical representation of a real store including a virtual representation of the products therein. Said user interface can be preconfigured according to the user's needs and preferences showing several types of virtual products available and arranging them in a single aisle or in multiple aisles, for example. Just like in a real store, the aisles of the virtual supermarket are organized according to product categories, for example, dairy, beverages, cereals, etc. The user can travel each aisle sequentially according to a predetermined configuration in the sequence of product categories, for example, through a preset selection by the user, user preferences or their purchase history. Alternatively, through a selection menu, the user can jump directly and dynamically to the area or section corresponding to a particular product category.

Figure 2A:
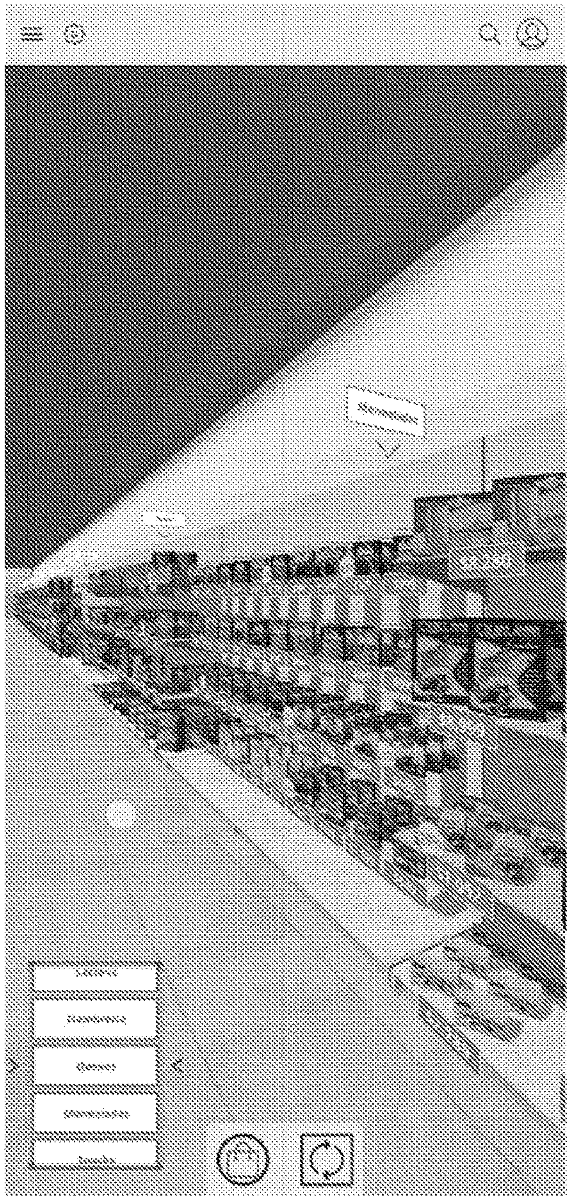
FIG. 2*a* shows a first visualization of the virtual store according to one embodiment of the invention.
Figure 2B:
FIG. 2*b* shows a second visualization of the virtual store according to one embodiment of the invention.
Figure 2C:
FIG. 2*c* shows a third visualization of the virtual store according to one embodiment of the invention.

FIG. 2*a* shows a graphic representation of a virtual store that has a single aisle with a single shelf simplifying the real layout of the store. Indeed, virtual graphic representation does not seek to resemble the layout of a store, but instead seeks to display virtual products in a familiar, friendly and simplified way, reducing the computational demand of the user device. Another example of graphical representation is shown in FIG. 2*b*, which allows greater detail of the virtual products on the shelf near the position of a virtual user. A third graphical representation is shown in FIG. 2*c*, showing multiple shelves and aisles, more like a real store. Such dissipation requires greater graphic processing capacity by the user device.

Depending on the user's preference, it is possible to present the three graphical representations simultaneously or sequentially, for example, a more general navigation using the representation in FIG. 2*e* to move to a more specific representation as in FIG. 2*b* and in FIG. 2*a*. As can be seen from the Figures, the graphic representation of the real store is not necessarily an exact simulation of a real store, but can be any representation that displays the virtual products to enhance the user experience which usually corresponds to a representation of a store.

Finally, among the particularities of the user interface, it stands out that it seeks to bring the user closer to an in-person shopping experience in stores, substantially improves product exploration compared to online shopping platforms, makes it easier to know user preferences and manage promotions based on these and allows the layout of the store to be adapted according to the user's preferences, among others.

Multi-Objective Planning System

Figure 3A:
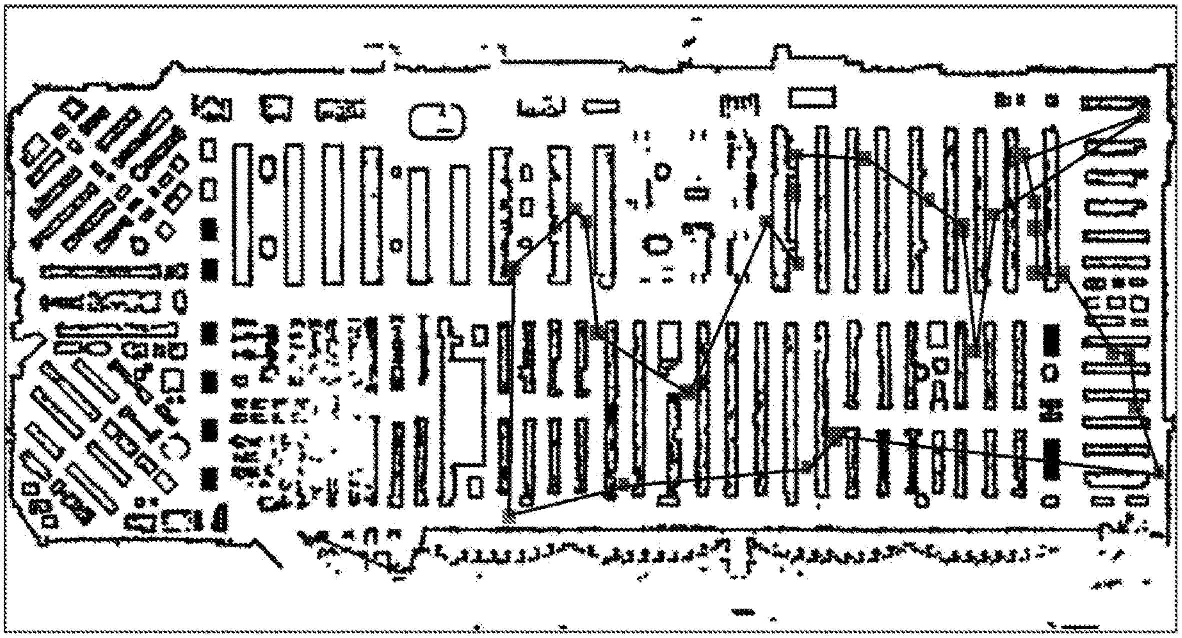
FIG. 3*a* shows a plan view of a real store where an optimal route for collecting a selection of products using a mobile robot overlaps.

The multi-objective planning system of the invention is configured to, according to the planimetry information of the real store (layout of a store), calculate optimal routes for the collection of the products included in a selection of products or purchase order. The multi-objective planning system allows to plan a global route that allows to autonomously complete a purchase order. Said global route, given the layout of the store, includes a series of points that a mobile robot must follow to complete the purchase order received, for example, generated in the virtual supermarket interface. As an example, FIG. 3*a* shows a plan view of a store on which the optimal route generated by the multi-objective planning system overlaps, in order to collect 30 selected products in a purchase order. To facilitate visualization, the route is indicated with straight lines that join the products. Represented by tables, however, it is clarified that the planner or planning system delivers valid routes without crossing shelves, that is, considering that the robot circulates through the aisles of the store.

Figure 3B:
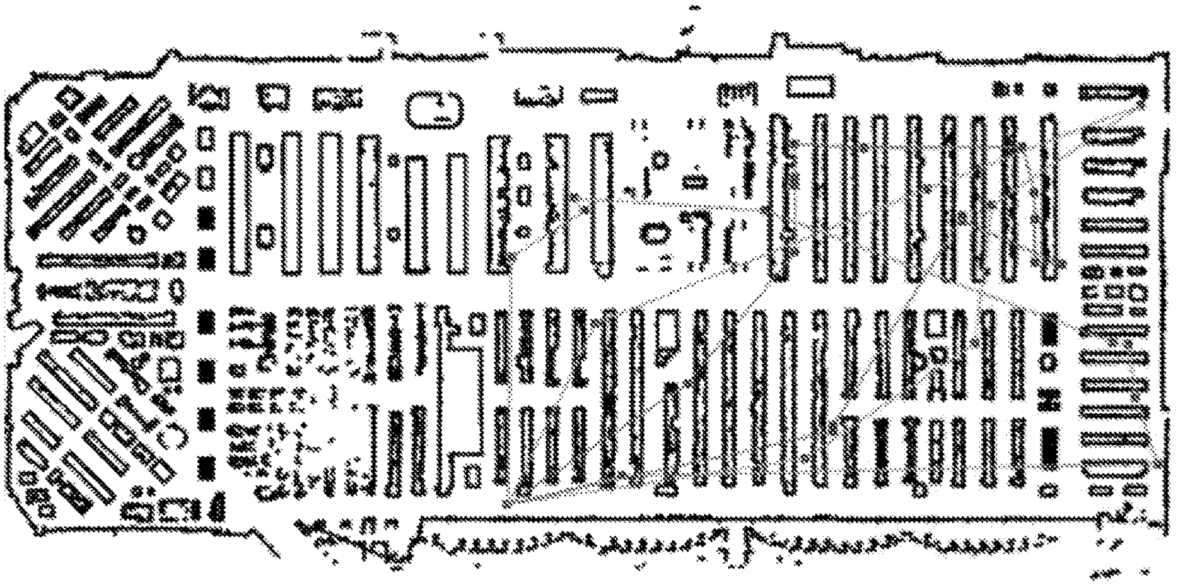
FIG. 3*b* shows a plan view of a real store where optimal routes to collect a selection of products by three mobile robots overlap.

Additionally, the multi-objective planning system has the ability to coordinate two or more mobile robots with the goal of retrieving products from one or more product selections or purchase orders at a time. FIG. 3*b* shows a representation like FIG. 3*a* but considering three mobile robots to retrieve products from the same selection of 30 products. Likewise, the planning system considers that the robots available in the store may have different capacities in their end effector to collect products from shelves, information that is used when assigning the products to each robot.

Product Recognition System

The product recognition system comprises identification algorithms to identify products in the real store, that is, to detect and recognize products on shelves in a supermarket, for example. For this purpose, identification algorithms have the ability to directly identify each product through a visual recognition system in real time.

To this end, the identification algorithms of the product recognition system are trained to detect products of several types, of different shapes and sizes, and identify them based on reading the information provided on the containers, wrappers or outer surface of the products. The above is not trivial, since the products available in stores have different shapes and sizes, both with respect to the packaging and with respect to products that are presented unwrapped, a situation that does not occur in warehouses or distribution centers. For example, there are products that are presented in formats such as blister, bag, bottle, box, packaging or packs, bottles, pots, jars, etc. Furthermore, the same product can be presented in different formats, for example, in an individual format or in a package.

Figure 4A:
FIG. 4*a* shows a first example of the vision information captured by the vision sensor assembly once processed by the identification algorithms.
Figure 4B:

In this sense, the invention comprises a training stage that requires the identification of various product categories based on their external appearance using deep learning algorithms for the detection of said categories based on the identification of the shapes from the vision information. In particular, the training stage allows obtaining a model capable of detecting instances of these product categories from images captured by the vision sensor assembly arranged in front of the shelf. As an example, FIG. 4*a* shows vision information with the identification of a "Box" as a product category while FIG. 4*b* shows vision information where the categories "Bag" and "Jar" are identified in the same image. So, unlike a generic product detector for the target application, the robot has information about the searched product, for example, a cereal box. This information is used by the robot, which after positioning itself in the shelf area where the required product is potentially located, detects only instances corresponding to the searched product category. This allows not only to increase the effectiveness of the detector, but also reduces the information processing load of the robot.

Finally, once possible instances of the required product have been located, the robot executes text and label detection algorithms in the areas corresponding to these detections. These algorithms have been previously trained with examples of texts and product labels based on deep learning techniques achieving high levels of effectiveness. The read texts and labels are then compared with a database with data on the texts present in the searched product, recognition being conducted if there is a significant match. It should be noted that to increase the effectiveness and efficiency of the algorithm for reading texts and labels its application makes use of the knowledge that the robot has of the product sought; specifically, the algorithm is not designed to read texts in a generic way, but to find a match between the main texts of the searched product and the candidate texts detected in the products located on the shelf. Once the product is recognized the algorithm uses the image and distance information to determine the precise location and distance of the product from the robot, information that is then used by the mechanism to collect the product from the shelf. Examples of text detection with respect to the presented vision information are also shown in FIG. 4*a* and FIG. 4*b*.

IMPLEMENTATION OF THE INVENTION

Finally, it is relevant to highlight that the present invention has great potential to present different implementations, not only in product stores such as supermarkets, but in any location where it is required to remove objects from shelves or any structure containing said objects.

Therefore, the description of the embodiments presented above should not be considered a restriction on the scope of the present invention comprising any variation applicable by a person normally skilled in the technical area.

The invention claimed is:

1. An autonomous robotic system for collecting products from a real store, comprising:

at least one real store comprising shelves with real products;

at least one mobile robot which is formed by a body comprising:

at least one processing unit;

at least one communications unit;

at least one vision sensor assembly configured to obtain image information and distance information, called vision information;

a mobile base comprising at least one drive unit configured to drive and direct the mobile robot;

at least one actuator arranged on the mobile base configured to manipulate and move real products from the shelves of the real store; and at least one temporary storage region arranged on the movable base configured to receive real products from the at least one actuator;

a navigation system in communication with the at least one drive unit, through the at least one communications unit and the at least one processing unit, wherein the navigation system accesses planimetry information of the real store;

a product recognition system in communication with the at least one vision sensor assembly through the at least one communications unit and the at least one processing unit, wherein the product recognition system accesses the vision information; and a multi-objective planning system in communication with the navigation system;

wherein the multi-objective planning system and the product recognition system receive a selection of products to be collected, wherein, based on the planimetry information of the real store, the multi-objective planning system is configured to calculate one or more optimal routes for collecting real products that match the at least one selection of products to be collected, and wherein said one or more optimal routes are communicated to the navigation system;

wherein the navigation system is configured to receive said one or more optimal routes and to drive the at least one drive unit of at least one mobile robot to travel the real store following at least one received optimal route;

wherein the product recognition system comprises identification algorithms configured to identify each real product on the shelves of the real store, wherein the at least one vision sensor assembly in communication with said product recognition system is arranged to obtain vision information of the shelves of the real store, and wherein the identification algorithms are configured to recognize shapes of objects corresponding to an exterior shape of the real products in said vision information, and to read logos or texts of the real products in said vision information identifying the real products and obtaining location and distance information of the identified real products;

wherein, when a mobile robot which travels through the real store following at least one optimal route identifies a real product matching one of the products to be collected from the at least one selection of products to be collected, the product recognition system is configured to drive the at least one drive unit of the at least one mobile robot to position itself in the vicinity of the shelf where said real matching product is located and to drive the at least one actuator of the at least one mobile robot based on the information of location and distance of the matching real product to collect the matching real product from the shelf and place it in the at least one temporary storage region, continuing with the at least one optimal route;

wherein actuating the at least one actuator to collect a matching real product based on the location and distance information of said matching real product, comprises executing a set of movements of the at least one actuator according to a position of the matching real product and a distance between the at least one actuator and the matching real product;

wherein the at least one actuator has at least two degrees of freedom comprising the following movements:

in height, along a first vertical axis spanning a height of the shelves in the real store; and in depth, along a first horizontal axis spanning the distance between the mobile robot and the products to be collected;

wherein the at least one actuator further comprises a third degree of freedom comprising rotational movement around a second vertical axis, encompassing at least two positions, a position for collecting products from shelves of the real store and a temporary storage position of products in the at least one temporary storage region; and wherein the at least one actuator comprises an end effector comprising at least two suction cups, wherein one suction cup is smaller than the other, wherein said end effector in turn has at least two degrees of freedom, comprising the following movements:

rotation about a second horizontal axis rotating the end effector to position it correctly in relation to the matching item or product to be collected; and tilting, by tilting the end effector once the matching product has been collected compensating for the strength to weight ratio of said product.

2. The system according to claim 1, a computer system in communication with the multi-objective planning system and with the product recognition system, and at least one user device in communication with the computer system; wherein the computer system is configured to process a graphic representation of the real store called virtual store, wherein said virtual store comprises shelves with a graphic representation of real products called virtual products; wherein the at least one user device is configured to display the virtual store to a user through a user interface, wherein said user interface is configured to receive the at least one selection of products to be collected as at least one selection of virtual products by the user and to communicate said at least one selection of virtual products to the computer system; and wherein the computer system is configured to receive the at least one selection of virtual products to be collected and to communicate it to the multi-objective planning system and the product recognition system.

3. The system according to claim 2, wherein the computer system is configured to generate said virtual store with said virtual products based on a set of virtual locations and/or predefined virtual products, wherein a layout of the virtual store and of the virtual products in the user interface is determined according to the user preferences previously communicated to the computer system and wherein the virtual store comprises at least one virtual corridor through which, through the user interface, the user can travel the virtual store at the same time as viewing the virtual products arranged on the shelves of the virtual store.

4. The system according to claim 3, wherein the virtual store is a two-dimensional representation of the real store formed by a single aisle with shelves of virtual products on one or both sides which are organized according to product categories that the user goes through as he or she moves along the single aisle, wherein the user interface includes at least two visualizations of the virtual store, one where part of the aisle and the virtual products arranged on the shelves are displayed, and another where the environment of a subset of virtual products is viewed with more detail.

5. The system according to claim 4, wherein the user's route in the virtual store comprises a menu that allows the user to jump directly to sections of products of interest without having to go through the entire virtual supermarket sequentially, these sections may be organized according to a common default configuration through a pre-established selection by the user, prioritizing to showing products according to the user's preferences or according to a user's purchase history.

6. The system according to claim 1, wherein the multi-objective planning system calculates the one or more optimal routes for at least one mobile robot based on one or more of:

number of product selections to be collected received by the multi-objective planning and product recognition systems;

type of matching real products; and matching real products location.

7. The system according to claim 6, wherein the multi-objective planning system is configured to coordinate two or more mobile robots for the collection of matching real products associated with one or more selections of products to be collected, and wherein the planning system is configured to assign each matching real product to one of the mobile robots and to adapt the route of each mobile robot and the order of the matching real products collection, calculating at least one optimal route for each mobile robot, wherein the calculation of optimal routes is configured according to operating objectives, such as minimum use of robots, minimum distance traveled or less delay time.

8. The system according to claim 1, wherein the end effector comprises three suction cups, two suction cups of equal size and a third suction cup of smaller size.

9. An actuator for collecting products from a real store by means of a mobile robot, said actuator being arranged on a mobile base comprising:

at least one drive unit configured to drive and direct the mobile robot, said actuator being configured to manipulate and move real products from shelves of the real store and towards at least one temporary storage region arranged on the mobile base, configured to receive real products from the at least one actuator;

a navigation system in communication with the at least one drive unit, through the at least one communications unit and the at least one processing unit, wherein the navigation system accesses planimetry information of the real store;

a product recognition system in communication with the at least one vision sensor assembly, through the at least one communications unit and the at least one processing unit, wherein the product recognition system accesses the vision information; and a multi-objective planning system in communication with the navigation system;

wherein, when a mobile robot, which travels through the real store following at least one optimal route, identifies a real product matching a product to be collected from at least one selection of products to be collected, a product recognition system of the mobile robot is configured to drive the at least one drive unit of the at least one mobile robot to position itself in the vicinity of the shelf where said matching real product is located and to drive the actuator of the at least one mobile robot based on the location and distance information of the matching real product to collect the matching real product from the shelf and place it in the at least one temporary storage region, continuing with the at least one optimal route;

wherein driving the actuator to collect a matching real product based on the location and distance information of said matching real product comprises executing a set of movements of the actuator according to a position of the matching real product and a distance between the actuator and the matching real product;

wherein the actuator has at least two degrees of freedom comprising the following movements:

in height, along a first vertical axis covering a height of the shelves in the real store; and in depth, along a first horizontal axis, covering the distance between the mobile robot and the products to be collected;

wherein the actuator further comprises a third degree of freedom comprising rotational movement around a second vertical axis, covering at least two positions, one position for collecting products from shelves of the real store and one position for temporary storage of products in the at least one temporary storage region; and wherein the actuator comprises an end effector comprising at least two suction cups, wherein one suction cup is smaller than the other, wherein said end effector, in turn, has at least two degrees of freedom comprising the following movements:

rotation about a second horizontal axis, rotating the end effector to correctly position it in relation to the matching item or product to be collected; and tilting, tilting the end effector once the matching product has been collected, compensating for the strength to weight ratio of said product.

10. The system according to claim 9, wherein at least part of the temporary storage region is configured as a shelf integrated into the body of the at least one mobile robot.

11. A method of operating an autonomous robotic system for collecting products remotely from a virtual store, wherein the autonomous robotic system comprises:

at least one real store comprising shelves with real products;

at least one mobile robot which is formed by a body comprising:

at least one processing unit;

at least one communications unit;

at least one vision sensor assembly configured to obtain image information and distance information, called vision information;

a mobile base comprising at least one drive unit configured to drive and direct the mobile robot;

at least one actuator arranged on the mobile base configured to manipulate and move real products from the shelves of the real store; and at least one temporary storage region arranged on the movable base configured to receive real products from the at least one actuator;

a navigation system in communication with the at least one drive unit, through the at least one communications unit and the at least one processing unit, wherein the navigation system accesses planimetry information of the real store;

a product recognition system in communication with the at least one vision sensor assembly, through the at least one communications unit and the at least one processing unit, wherein the product recognition system accesses the vision information;

a multi-objective planning system in communication with the navigation system;

a computer system in communication with the multi-objective planning system and the product recognition system; and at least one user device in communication with the computer system;

the method comprising:

a) showing, by means of the at least one user device, a virtual store to a user through a user interface, wherein said virtual store is a graphic representation of the real store and comprises shelves with a graphic representation of the real products called virtual products;

b) receiving, through said user interface, at least one selection of virtual products by the user, communicating said at least one selection of virtual products to the computer system, wherein the computer system communicates said at least one selection of virtual products to the multi-objective planning and product recognition system;

c) calculating, through the multi-objective planning system and based on the planimetry information of the real store, one or more optimal routes for the collection of real products matching the at least one selection of virtual products communicating said one or more optimal routes to the navigation system;

d) driving, through the navigation system the at least one drive unit of at least one mobile robot to travel the real store following at least one received optimal route;

e) identifying, by means of the recognition system comprising identification algorithms, real products that match the virtual products of the at least one selection of the virtual products received, comprising:

e.1) obtaining, by means of the at least one vision sensor assembly, vision information of the real store shelves, e.2) recognizing objects shapes corresponding to an exterior shape based on the visual appearance of real products in said vision information, and e.3) reading logos or texts of the real products in said vision information, identifying the matching real products and obtaining location and distance information of the identified matching real products;

f) collecting the identified matching real products, wherein the product recognition system drives the at least one drive unit of the at least one mobile robot to position itself in the vicinity of the shelf where an identified matching real product is located and drives the at least one actuator of the at least one mobile robot based on location and distance information of the identified matching real product, in order to collect it from the shelf of the real store;

g) placing the collected real products in the at least one temporary storage region located in the body of the at least one mobile robot; and h) to continue with at least one optimal route.

12. The method according to claim 11, wherein the step of calculating the one or more optimal routes for at least one mobile robot is executed based on one or more of:

number of virtual product selections communicated to the computer system;

type of matching real products; and location of matching real products.

13. The method according to claim 12, wherein the step of calculating the one or more routes for at least one mobile robot further comprises coordinating, by means of the multi-objective planning system, two or more mobile robots for the collection of matching real products associated with one or more selections of virtual products, wherein the multi-objective planning system assigns each matching real product to one of the mobile robots and adjusts the route of each mobile robot and the order for collecting the matching real products calculating at least one optimal route for each mobile robot.

14. The method according to claim 12, wherein the step of calculating the on or more optimal routes for at least one mobile robot further comprises calculating the optimal routes according to operating objectives such as minimum use of robots, minimum distance traveled or less delay time.

15. The method according to claim 11, wherein the step of collecting the identified matching real products, by driving the at least one actuator to collect a matching real product, based on the location and distance information of said matching real product, comprises executing a set of movements of the at least one actuator according to a position of the matching real product and a distance between the at least one actuator and the matching real product.

16. A mobile robot for collecting products remotely formed by a body that includes:

at least one processing unit;

at least one communications unit;

at least one vision sensor assembly configured to obtain image information and distance information, called vision information;

a mobile base comprising at least one drive unit configured to drive and direct the mobile robot;

at least one actuator arranged on the mobile base configured to manipulate and move real products from the shelves of the real store; and at least one temporary storage region arranged on the mobile base configured to receive real products from the at least one actuator;

wherein the robot also includes:

a navigation system in communication with the at least one drive unit, through the at least one communications unit and the at least one processing unit, wherein the navigation system accesses planimetry information of a real store;

a product recognition system in communication with the at least one vision sensor assembly, through the at least one communications unit and the at least one processing unit, wherein the product recognition system accesses the vision information;

a multi-objective planning system in communication with the navigation system; and a computer system in communication with the multi-objective planning system and the product recognition system;

wherein the computer system is configured to receive at least one products selection and to communicate it to the multi-objective planning system and the product recognition system, wherein based on the planimetry information of the real store the multi-objective planning system is configured to calculate an optimal route for the collection of matching real products with the at least one selection of products, and wherein said optimal route is communicated to the navigation system;

wherein the navigation system is configured to receive said optimal route and to drive the at least one drive unit of the mobile robot to travel the real store following the received optimal route;

wherein the product recognition system comprises identification algorithms configured to identify each real product on the shelves of the real store, wherein the at least one vision sensor assembly in communication with said product recognition system is arranged to obtain vision information from the real store shelves, and wherein the identification algorithms are configured to recognize objects shapes corresponding to an exterior shape of the real products in said vision information, and to read logos or texts of the real products in said vision information identifying the real products and obtaining location and distance information of the identified real products; and wherein, when the mobile robot, which travels through the real store following the optimal route, identifies a real product matching one of the products of the at least one received selection of products, the product recognition system is configured to activate the at least one drive unit of the mobile robot to position itself in the vicinity of the shelf where said matching real product is located and to operate the at least one actuator of the mobile robot based on the location and distance information of the matching real product, to collect the matching real product from the shelf and placing it in the at least one temporary storage region continuing with the optimal route.

* * * * *